US010732340B2

(12) United States Patent
Schubert et al.

(10) Patent No.: US 10,732,340 B2
(45) Date of Patent: Aug. 4, 2020

(54) HEAD-MOUNTED DISPLAY WITH OFF-BOARD ILLUMINATION

(71) Applicant: GOOGLE INC., Mountain View, CA (US)

(72) Inventors: Martin Friedrich Schubert, Sunnyvale, CA (US); Michael Grundmann, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 199 days.

(21) Appl. No.: 15/656,589

(22) Filed: Jul. 21, 2017

(65) Prior Publication Data

US 2018/0024286 A1 Jan. 25, 2018

Related U.S. Application Data

(60) Provisional application No. 62/365,075, filed on Jul. 21, 2016.

(51) Int. Cl.
*F21V 8/00* (2006.01)
*G02B 27/01* (2006.01)

(52) U.S. Cl.
CPC ........... *G02B 6/0028* (2013.01); *G02B 6/005* (2013.01); *G02B 6/0006* (2013.01);
(Continued)

(58) Field of Classification Search
CPC ................................................. G02B 27/017;
G02B 27/0172; G02B 6/0006; G02B 6/0008; G02B 6/0028; G02B 6/005; G02B 6/0068; G02B 6/0075
See application file for complete search history.

(56) References Cited

U.S. PATENT DOCUMENTS 5,301,090 A * 4/1994 Hed ....................... G02B 6/001
362/558
5,673,059 A 9/1997 Zavracky et al.
(Continued)

FOREIGN PATENT DOCUMENTS

WO WO-2016140720 A2 * 9/2016 ............. G02B 1/002

OTHER PUBLICATIONS

International Search Report and Written Opinion for International Application PCT/US2017/043300, dated Jan. 8, 2018, 20 pages.
(Continued)

*Primary Examiner* — Leah Simone Macchiarolo
(74) *Attorney, Agent, or Firm* — Brake Hughes Bellermann LLP

(57) ABSTRACT

Techniques of providing illumination to a head-mounted display (HMD) involve providing off-board illumination apart from the HMD. An off-board illumination unit delivers the illumination to the HMD via optical fibers. The optical fibers are lightweight and do not restrict motion of a user. Because the power source is less restricted, the off-board illumination unit provides flexibility in the hardware used to generate the illumination. For example, the illumination unit may use red, green, and blue narrow-band diode lasers. Further, by controlling modes in the fiber and providing additional light-guiding hardware, the angles at which light strikes LCD pixels may be largely restricted to certain specified angles. Restricted angles of incidence enable the use of fast-switching liquid crystals without degrading the image quality. Such a restriction allows for high-resolution imaging using rapid switching of the liquid crystal which enables very low latencies.

18 Claims, 10 Drawing Sheets

(52) U.S. Cl.
CPC ......... *G02B 6/0008* (2013.01); *G02B 6/0068* (2013.01); *G02B 6/0075* (2013.01); *G02B 27/0172* (2013.01)

(56) References Cited

U.S. PATENT DOCUMENTS

| | | |
|---|---|---|
| 6,280,054 B1 | 8/2001 | Cassarly et al. |
| 7,206,133 B2 | 4/2007 | Cassarly et al. |
| 8,705,177 B1 * | 4/2014 | Miao ................. G02B 27/0172 359/630 |
| 9,576,398 B1 * | 2/2017 | Zehner ................. G06T 19/006 |
| 2006/0146518 A1 | 7/2006 | Dubin et al. |
| 2013/0106847 A1 * | 5/2013 | Sugiyama ............ G03H 1/2294 345/419 |
| 2014/0355086 A1 | 12/2014 | Kasazumi et al. |

OTHER PUBLICATIONS

Invitation to Pay Add'l Fees and Partial Search Report from Appn No. PCT/US2017/043300, dated Nov. 6, 2017, 15 Pages.

* cited by examiner

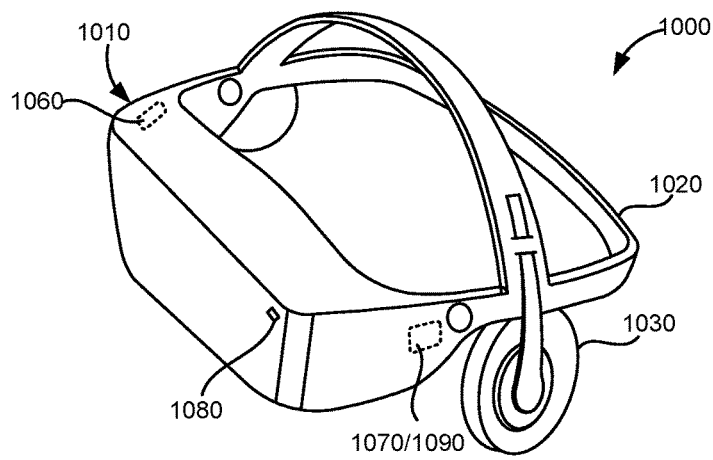
FIG. 10A
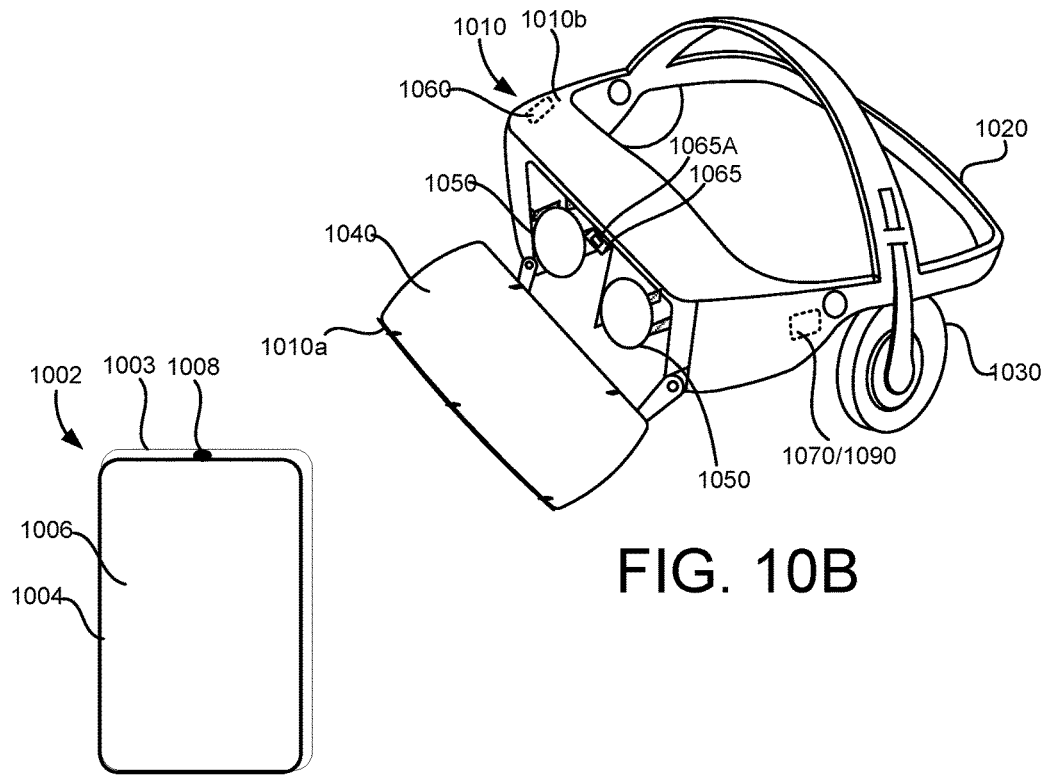
FIG. 10B
FIG. 10C

HEAD-MOUNTED DISPLAY WITH OFF-BOARD ILLUMINATION

CROSS REFERENCE TO RELATED APPLICATION

This application claims priority to U.S. Provisional Application No. 62/365,075, filed on Jul. 21, 2016, the disclosure of which is incorporated by reference herein.

TECHNICAL FIELD

This description generally relates to head-mounted displays (HMDs).

BRIEF DESCRIPTION OF THE DRAWINGS

FIGS. 10A, 10B, and 10C are diagrams depicting the example VR HMD and an example controller.

Like reference symbols in the various drawings indicate like elements.

DETAILED DESCRIPTION

Head-mounted displays (HMDs) provide an immersive experience for users in applications such as virtual reality (VR) and augmented reality (AR). Such HMDs may be an organic light-emitting diode (OLED) or most commonly a liquid-crystal display (LCD).

The brightness of a pixel in an LCD display is generally not controlled by varying the intensity of any light source. Rather, the brightness is controlled by selectively attenuating light incident upon the pixel. The light incident upon the LCD is generated separately, typically via light-emitting diodes (LEDs).

Conventional techniques of providing illumination to an HMD involves placing the LEDs used with an HMD on board the HMD. The LEDs require a continuous source of power to drive the illumination of the LCD pixels. Because the optical efficiency of an LCD is generally very low, a very large amount of power is necessary. Such a large amount of power is typically provided by a large battery in the HMD.

In contrast to the conventional techniques of providing illumination to an HMD that requires a large battery on board the HMD, improved techniques involve off-board illumination apart from the HMD. An off-board illumination unit delivers the illumination to the HMD via optical fibers. The optical fibers are lightweight and do not restrict motion of a user or otherwise interfere with the user experience in any meaningful way. Because the power source is less restricted, the off-board illumination unit provides flexibility in the hardware used to generate the illumination. For example, the illumination unit may use red, green, and blue narrow-band diode lasers. Further, by controlling modes in the fiber and providing additional light-guiding hardware, the angles at which light strikes the LCD pixels may be largely restricted to certain specified angles. Restricted angles of incidence enable the use of fast-switching LCs without degrading the image quality. Such a restriction allows for high-resolution imaging using rapid switching of the liquid crystal which enables very low latencies. Color-sequential delivery of the illumination provides opportunities to improve image resolution.

Figure 1:
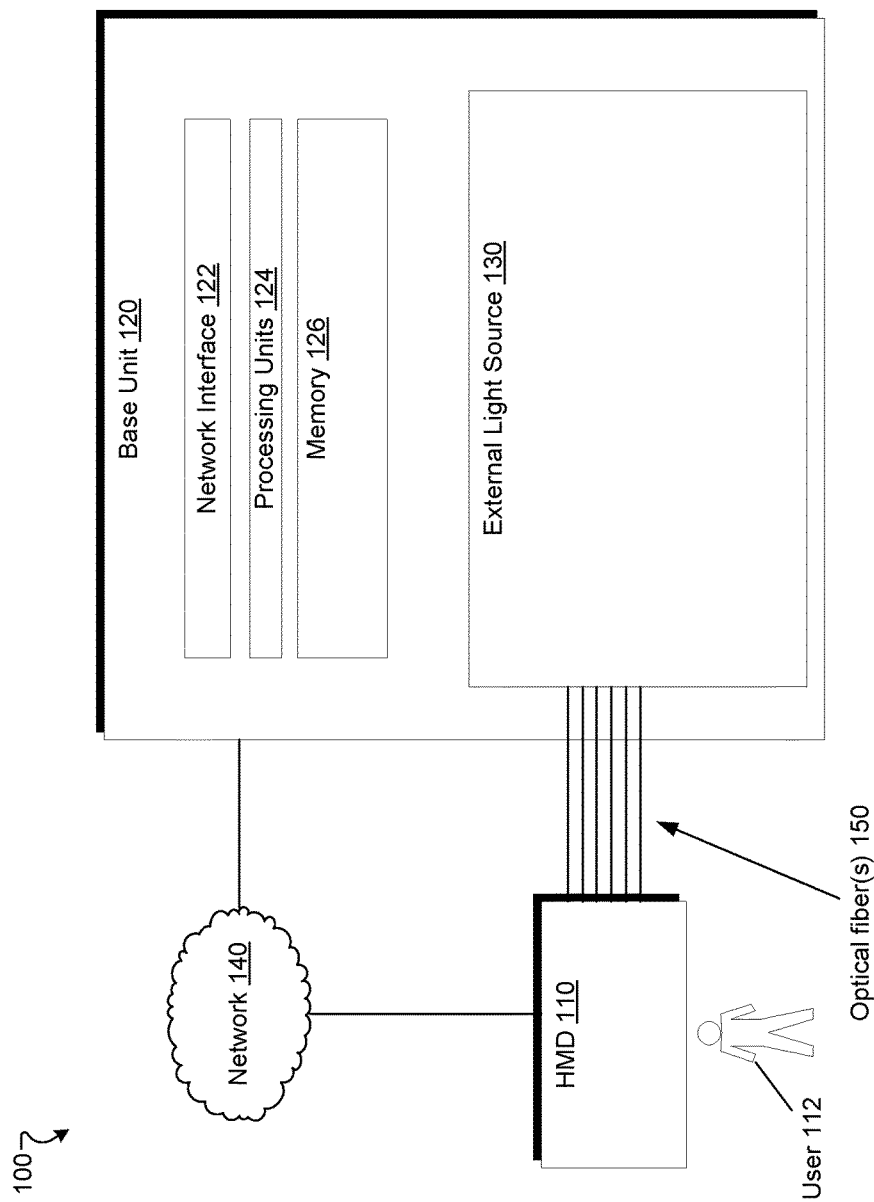
FIG. 1 is a block diagram of an example electronic environment for performing improved techniques of providing illumination to HMDs.

FIG. 1 is a block diagram depicting an example electronic environment 100 according to the improved techniques described herein. The electronic environment 100 includes a HMD 110, a base unit 120 that includes an external light source 130, a network 140, and optical fibers 150. In some arrangements, the external light source 130 is separate from the base unit 120.

The HMD 110 is configured and arranged to provide an immersive VR or AR experience to the user 112. To provide such an experience to the user 112, the HMD includes a LCD (not shown). The HMD receives image data over the network 140 (i.e., instructions to switch LCD pixels on and off) and illumination over the optical fibers 150.

The base unit 120 is configured and arranged to provide images to the HMD 110. To this effect, the base unit 120 includes a network interface 122, processing units 124, memory 126, and an external light source 130.

The network interface 122 includes, for example, Ethernet adaptors, Token Ring adaptors, and the like, for converting electronic and/or optical signals received from the network 140 to electronic form for use by the base unit 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

The components (e.g., modules, processing units 124) of the base unit 120 can be configured to operate based on one or more platforms (e.g., one or more similar or different platforms) that can include one or more types of hardware, software, firmware, operating systems, runtime libraries, and/or so forth. In some implementations, the components of the base unit 120 can be configured to operate within a cluster of devices (e.g., a server farm). In such an implementation, the functionality and processing of the components of the base unit 120 can be distributed to several devices of the cluster of devices.

The components of the base unit 120 can be, or can include, any type of hardware and/or software configured to process attributes. In some implementations, one or more portions of the components shown in the components of the base unit 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the base unit 120 can be, or can include, a software module configured for execution by at least one processor (not shown). In some implementations, the functionality of the components can be included in different modules and/or different components than those shown in FIG. 1.

Although not shown, in some implementations, the components of the base unit 120 (or portions thereof) can be configured to operate within, for example, a data center (e.g., a cloud computing environment), a computer system, one or more server/host devices, and/or so forth. In some implementations, the components of the base unit 120 (or portions thereof) can be configured to operate within a network. Thus, the components of the base unit 120 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some embodiments, one or more of the components of the base unit 120 can be, or can include, processors configured to process instructions stored in a memory. In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the base unit 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the base unit 120.

The external light source 130 is configured and arranged to provide illumination to the HMD 110 over the optical fibers 150. The external light source 130 may draw its power from the same source as the base unit 120 or it may have its own power supply. The illumination that the external light source 130 provides to the HMD may be white LEDs or color LEDs (e.g., red, green, blue). Alternatively, the illumination may be generated from a narrow-band source such as diode lasers. The external light source 130 further includes a mechanism for coupling the generated illumination into the optical fibers 150, e.g., coupling optics.

The network 140 is configured and arranged to provide network connections between the HMD 110 and the base unit 120. The network 140 may implement any of a variety of protocols and topologies that are in common use for communication over the Internet or other networks. Further, the network 140 may include various components (e.g., cables, switches/routers, gateways/bridges, etc.) that are used in such communications.

The optical fibers 150 are configured and arranged to deliver the illumination generated by the external light source 130 to the HMD 110. The optical fibers 150 may be single-mode or multimode, although single-mode or low-mode-count fibers are preferable so that the modal behavior of the illumination delivered to the HMD may be controlled. Additional benefit may also be realized by having the fibers be polarization-maintaining.

Figure 2:
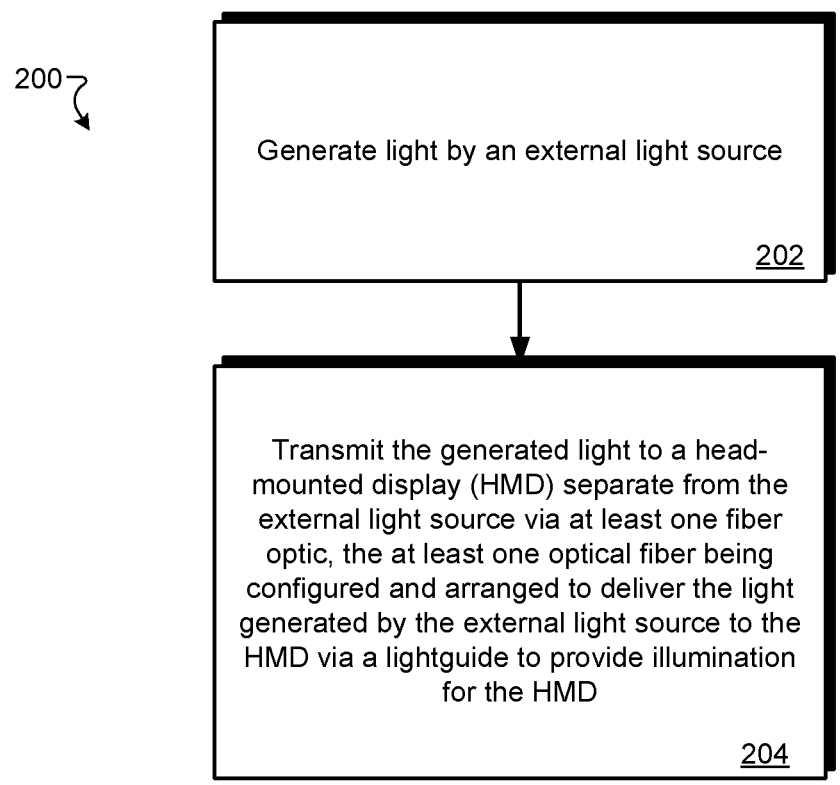
FIG. 2 is a flow chart depicting an example method of illuminating a HMD according to the improved techniques.

FIG. 2 is a flow chart depicting an example method 200 of illuminating an HMD. The method 200 may be performed by software constructs described in connection with FIG. 1, which reside in memory 126 of the base unit 120 and are run by the set of processing units 124.

At 202, an external light source generates light. For example, a set of LEDs in the external light source 130 produce red, green, and blue light.

At 204, the generated light is transmitted to the HMD, which is separate from the external light source, via at least one optical fiber. The at least one optical fiber is configured and arranged to deliver the light generated by the external light source to the HMD via a lightguide to provide illumination for the HMD.

Figure 3:
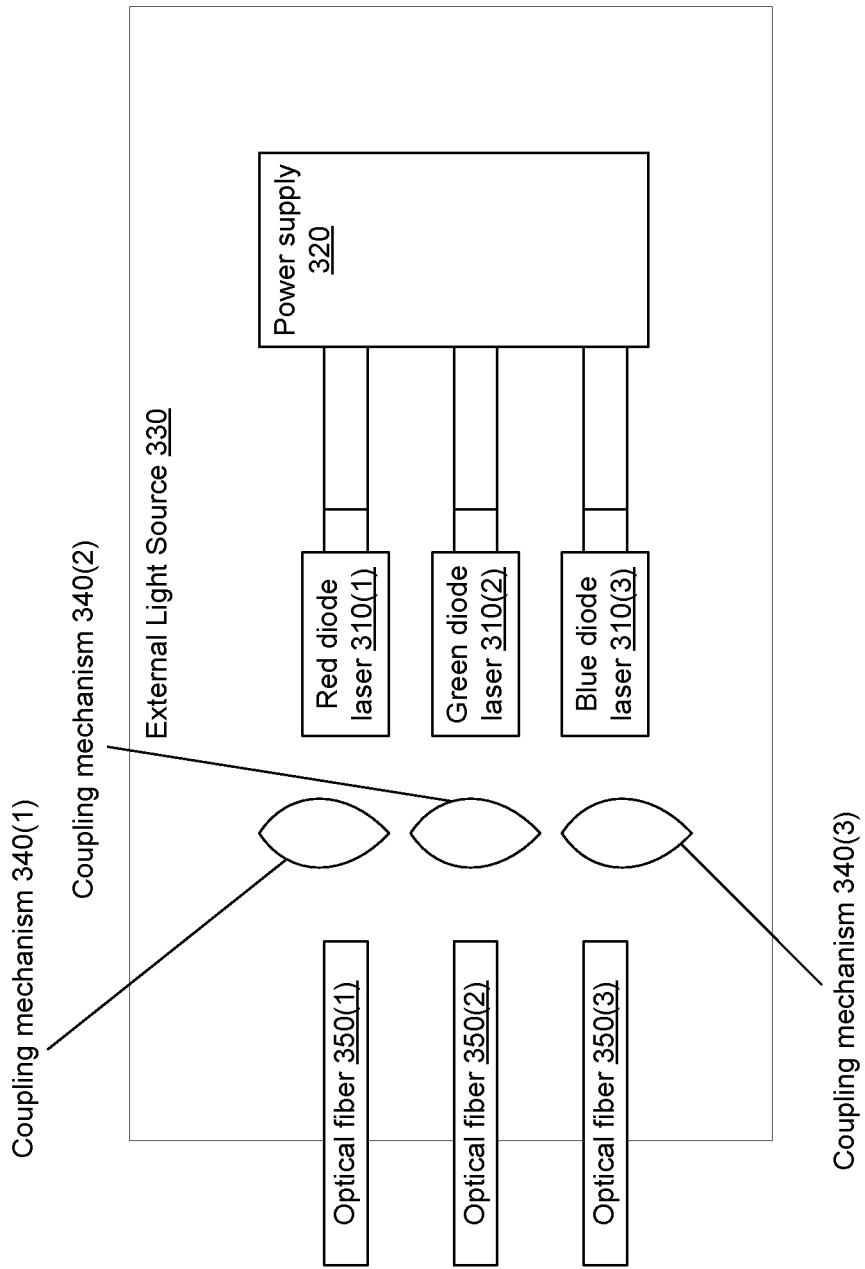
FIG. 3 is a block diagram of an example external light source within the electronic environment shown in FIG. 1.

FIG. 3 is a block diagram of an example external light source, e.g., external light source 330 (FIG. 1). The external light source 330 depicted in FIG. 3 includes a set of diode lasers (red 310(1), green 310(2), and blue 310(3)), respective optical fibers 350(1), 350(2), 350(3) and coupling mechanisms 340(1), 340(2), 340(3), and a power supply 320. In some implementations, the diode lasers may be replaced by other narrow-band sources or LEDs. Further, even though there are three lasers depicted in FIG. 3, in other arrangements there may be any number of lasers, e.g., as few as one, and as many as ten or more.

Each of the diode lasers 310(1), 310(2), 310(3) is configured to operate at a respective wavelength (e.g., red at about 635 nm, green at about 532 nm, blue at about 445 nm). The different wavelengths may be achieved through frequency doubling techniques, although the wavelengths are now more commonly achieved directly. Typical materials used as gain media in diode lasers 310(1), 310(2), 310(3) include aluminium gallium indium phosphide (red), neodymium-doped yttrium orthovanadate (green), and indium gallium nitride (blue). The spectral widths of the diode lasers are each typically about 1 nm. (Compare these spectral widths to spectral widths of LEDs which are about 20-40 nm.) An advantage of narrow spectral widths is the limitation of a range of angles through which the light propagates in the optical fibers 350(1), 350(2), and 350(3).

In some implementations, the diode lasers 310(1), 310(2), and 310(3) are edge-emitting and are configured to output a beam of elliptical cross section with an angular divergence of about 30 degrees about a vertical axis and about 10 degrees about a horizontal axis. In this case, each beam output by the diode lasers 310(1), 310(2), and 310(3) is polarized largely in a direction parallel to one of the vertical axis ("s-polarized") and horizontal axis ("p-polarized"). In some implementations, the diode lasers 310(1), 310(2), and 310(3) are vertical cavity surface emitting lasers (VCSELs) and are configured to produce a substantially symmetric beam that is either unpolarized, circularly polarized, or (desirably) linearly polarized.

The power supply 320 is a regulated electrical power supply that provides each of the diode lasers 310(1), 310(2), 310(3) with enough power to operate in either continuous wave (CW) or pulsed operation. Typically, the power supply 320 is configured to operate at a voltage of about 12 V to produce power between about 200 mW and 1000 mW. However, in some implementations a broader range, e.g., up to 5 W, is used as there may be electrical-optical conversion losses which are significant.

Each of the coupling mechanisms 340(1), 340(2), and 340(3) is configured to couple the mean output from a respective diode laser, e.g., 310(1), into a corresponding optical fiber 350(1). As depicted in FIG. 3, each coupling mechanisms 340(1), 340(2), and 340(3) takes the form of a lens. Such a lens is configured to map the divergence angle of the output beam of the respective diode laser, e.g., 310(1) into a cone of light subtending an angle less than an acceptance angle of the corresponding fiber optic 350(1).

Each optical fiber, e.g., optical fiber 350(1), has a core of index of refraction $n_1$ and a cladding of index of refraction $n_2$ surrounding the core. The acceptance angle of the fiber optic 350(1) is equal to arcsin ($\sqrt{n_1^2-n_2^2}$). (The argument of the arcsine is known as the numerical aperture (NA) of the fiber optic 350(1).) Typically, each optical fiber, e.g., optical fiber 350(1) has an entrance surface that is cleaved and polished flat and is perpendicular to an optical axis of symmetry (i.e., the propagation axis). However, in some implementations, the entrance surface is cleaved at an angle with respect to the normal to the axis of symmetry.

Further, each optical fiber, e.g., optical fiber 350(1), is a multimode fiber configured to propagate some number of waveguide modes from each diode laser, e.g., 310(1), to the HMD 110 (FIG. 1). Such an optical fiber 350(1) may be described with a quantity known as a V-number, where $$V = \frac{2\pi}{\lambda} a \sqrt{n_1^2 - n_2^2}$$

and α is the radius of the core of the optical fiber 350(1) (about 0.1 mm) and λ is the wavelength of the light propagating through the optical fiber 350(1). The number of waveguide modes propagating within the optical fiber 350(1) is approximately $1/2V^2$.

Moreover, each optical fiber, e.g., optical fiber 350(1), may be configured and arranged to preserve a polarization state of the light generated by a diode laser, e.g., diode laser 310(1). That is, the polarization of the light generated by each optical fiber, e.g., optical fiber 350(1), is the polarization of the light delivered to the HMD 110.

The external light source 330 is configured and arranged to generate and deliver illumination to the HMD 110 in any specified temporal pattern. For example, in some implementations, the external light source 330 is configured and arranged to generate and deliver the red, green, and blue light from, respectively, the diode lasers 310(1), 310(2), and 310(3) simultaneously. In some implementations, external light source 330 is configured and arranged to generate and deliver the red, green, and blue light sequentially, e.g., as red, then green, then blue. An advantage of delivering the light sequentially is that such a delivery provides increased brightness as well as improved resolution and power consumption. In some implementations, the light generated by the diode lasers 310(1), 310(2), and 310(3) may be delivered altogether over each of the fibers.

Figure 4:
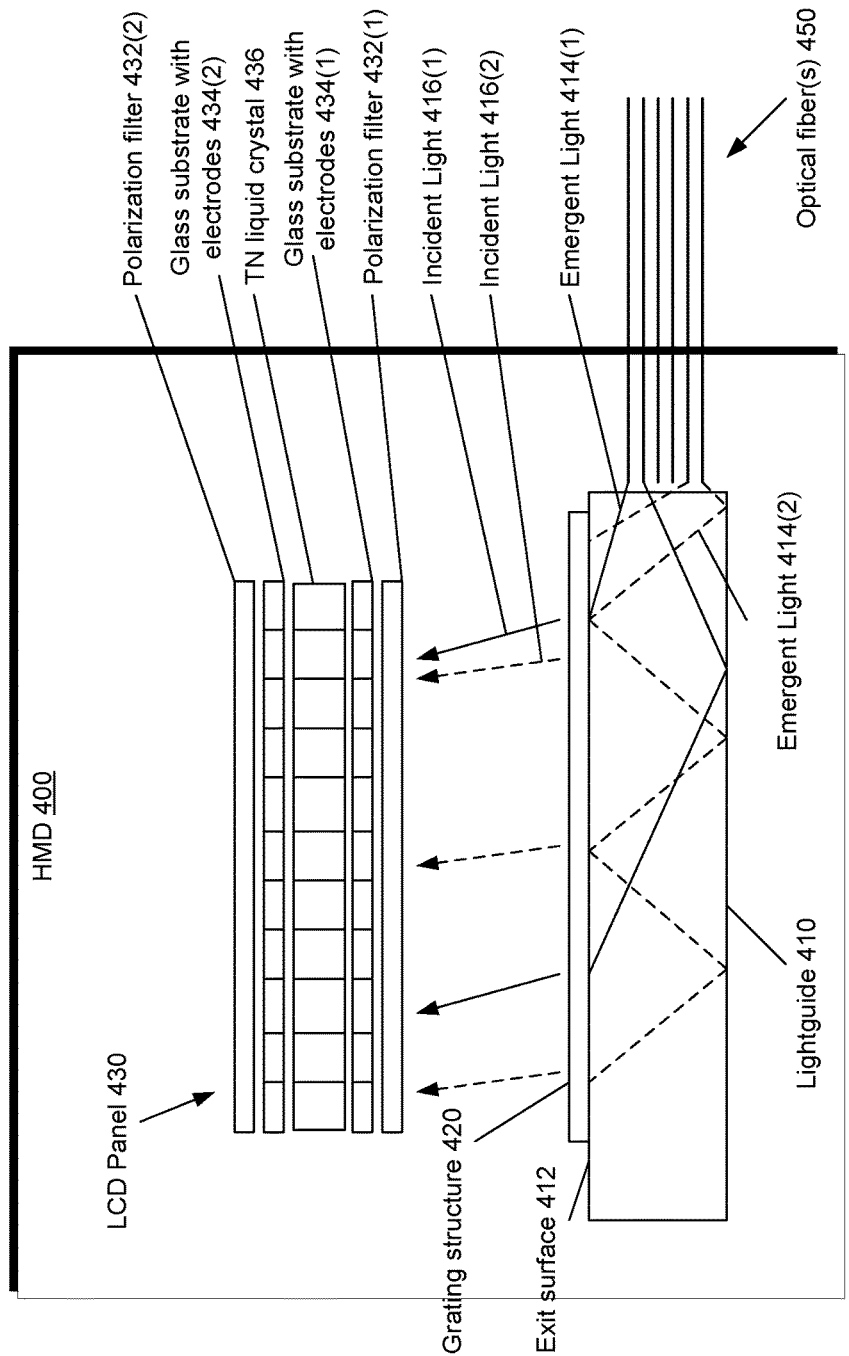
FIG. 4 is a diagram of an example HMD within the electronic environment shown in FIG. 1.

FIG. 4 is a diagram of an example HMD 400. As depicted in FIG. 4, HMD 400 includes a lightguide 410 that has a grating structure 420 on an exit surface 412 and an LCD panel 430. Generally speaking, the LCD panel 430 is an example of a set of spatial light modulators (SLMs). Along these lines, another example of a an SLM is a microelectromechanical system (MEMS) grating light valve.

The lightguide 410 is configured and arranged to direct emergent light 414 (1) and 414(2) delivered by the optical fibers 450 to the LCD panel 430. As depicted in FIG. 4, the lightguide 410 accepts emergent light 414(1) and 414(2) from the optical fibers 450. The emergent light 414(1) and 414(2) undergoes reflections from surfaces of the lightguide 410 until it emerges through the exit surface 412, from which the emergent light 414(1) and 414(2) is transformed into incident light 416(1) and 416(2) by a grating structure 420 on the exit surface 412.

As depicted in FIG. 4, the emergent light 414(1) is delivered by an optical fiber 450 (and which may correspond to the optical fiber 350(1) in FIG. 3) and the emergent light 414(2) is delivered by another optical fiber 450 (and which may correspond to the optical fiber 350(3) in FIG. 3). In this case, the emergent light 414(1) may be red and propagate within a first range of angles while the emergent light 414(2) may be blue and propagate within a second range of angles.

The grating structure 420 is configured and arranged to direct emergent light 414(1) and 414(2) having a first wavelength and first propagation angle toward the LCD panel 430 and a second wavelength and second propagation angle away from the LCD panel 430.

The LCD panel 430 is configured to display dynamic images to the user 112 (FIG. 1) in such a way as to provide an immersive experience with very little latency. As depicted in FIG. 4, the LCD panel 430 includes a pair of polarization filters 432(1) and 432(2), a pair of glass substrates with electrodes 434(1) and 434(2), and a twisted nematic (TN) liquid crystal 436. In some arrangements, the liquid crystal 436 may be in-plane switching (IPS) instead of TN.

The polarization filters 432(1) and 432(2) are each configured to pass through light in a first polarization state and block light in a second polarization state. For example, the polarization filter 432(1) may allow s-polarized light to pass through and block p-polarized light, while the polarization filter 432(1) may allow p-polarized light to pass through and block s-polarized light.

The glass substrates 434(1) and 434(2) provide, for each LCD pixel, electrodes across which a voltage (e.g., 5 V) may or may not be applied for that LCD pixel.

The TN liquid crystal 436 for a LCD pixel is configured and arranged to rotate the polarization of light incident upon the LCD pixel (which should be s-polarized after passing through the filter 432(1)) by 90 degrees when there is no voltage applied to the glass substrates 434(1) and 434(2). The TN liquid crystal 436 is also configured and arranged to not rotate the polarization of the light incident upon the LCD pixel. The consequence is that the light will pass through the filter 432(2) when no voltage is applied to the glass substrates 434(1) and 434(2) for the LCD pixel, while no light will pass through the filter 432(2) when the voltage is applied to the glass substrates 434(1) and 434(2) for the LCD pixel. Application of the voltage to the glass substrates 434(1) and 434(2) for a LCD pixel switches off light to that LCD pixel.

However, the switching off of the light to an LCD pixel is typically not perfect. A measure of how well an LCD pixel has been switched off is a contrast ratio, with high contrast ratios indicating better switching off. The ability of the HMD 400 to maintain a high contrast ratio depends on the range of angles through which the incident light 416(1) and 416(2) propagates toward the LCD panel 430. While it is possible to maintain a high contrast ratio with a large range of angles, LCD pixel structures with this characteristic are generally more expensive to fabricate and yield slower switching speeds. Slow switching speeds are not desirable in VR applications as the latency between movement and action seen on a display results in a poor user experience.

In some implementations, the range of angles incident on the LCD panel 430 is limited as much as possible in order to achieve a higher contrast ratio at a fast switching rate. The optical fibers 450 may be designed so as to restrict the range of angles of propagation of the incident light 416(1) and 416(2). As discussed above, the size of the core and the materials that constitute the core and cladding of each optical fiber 450 determine how many modes that optical fiber 450 carries. As each mode corresponds to an angle of propagation, the number of range of angles of propagation of the emergent light 414(1) and 414(2) may be controlled by controlling the V-number of that optical fiber 450, or the size of the core and indices of refraction of the core and cladding of that optical fiber 450.

Figure 5:
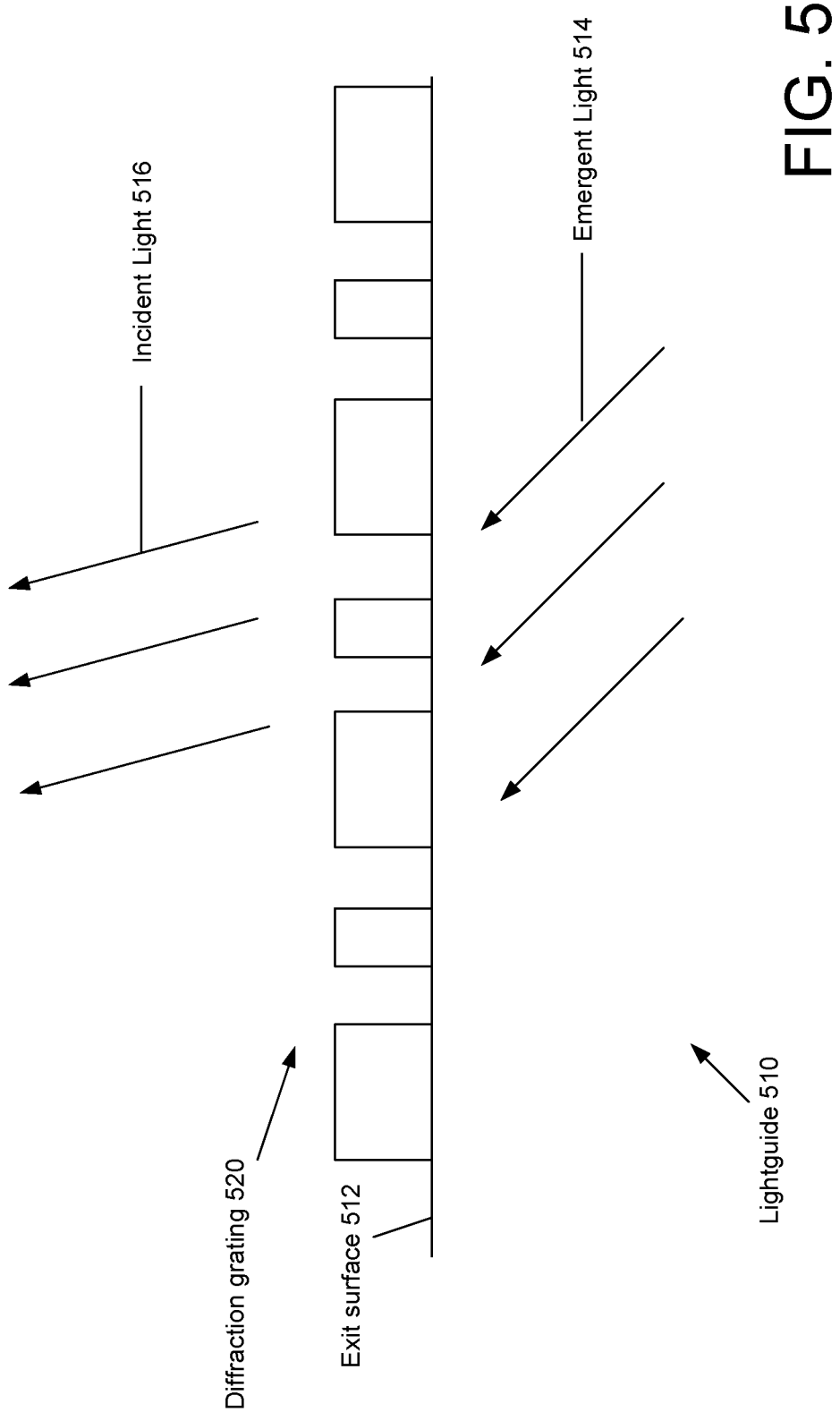
FIG. 5 is a diagram of an example guiding structure within the HMD shown in FIG. 4.
Figure 6:
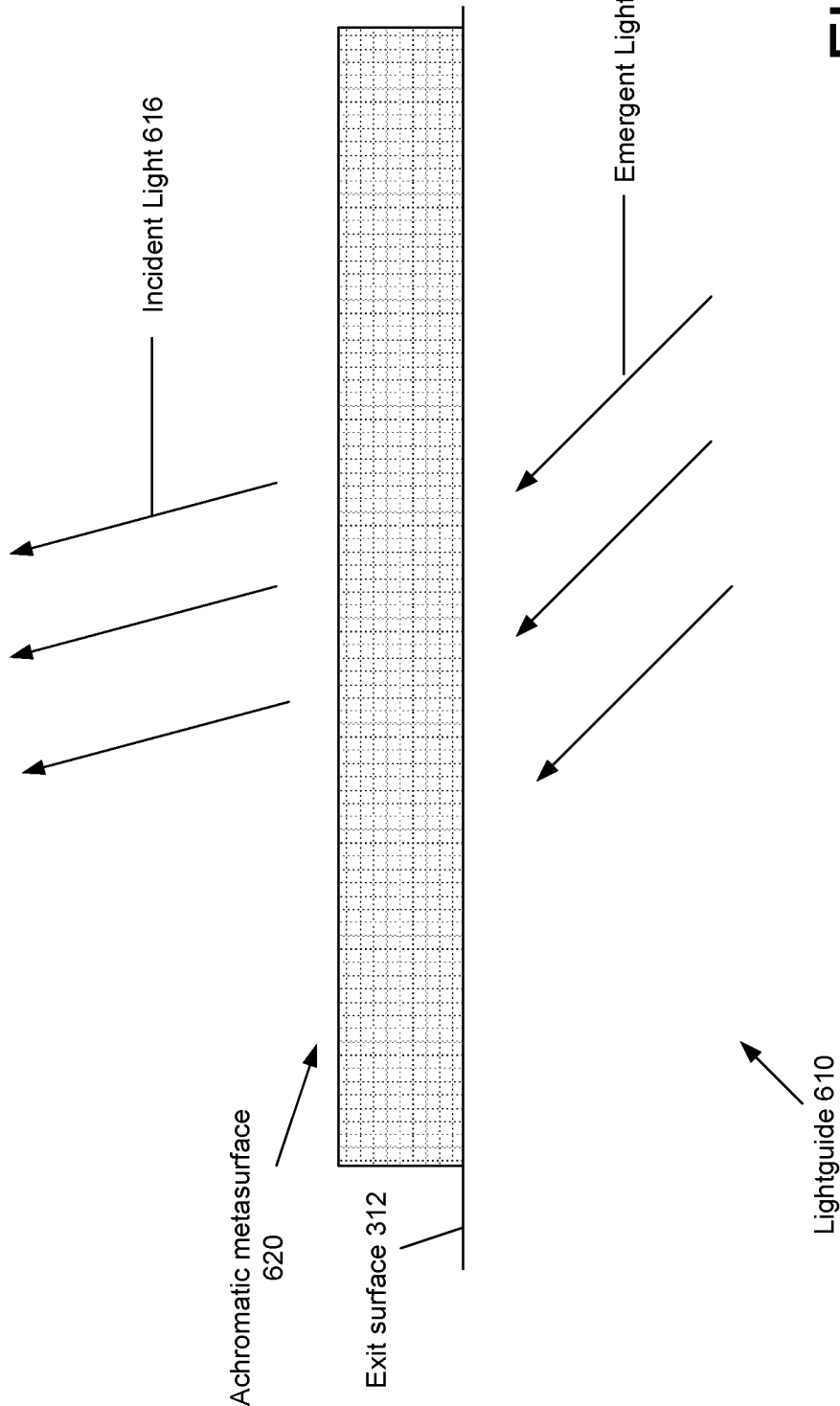
FIG. 6 is a diagram of another example guiding structure within the HMD shown in FIG. 4.

The range of angles of propagation of the incident light 416(1) and 416(2) may be further restricted by the grating structure 420. FIGS. 5 and 6 describe possible configurations of the grating structure 420.

FIG. 5 is a diagram of an example lightguide 510. The lightguide 510 includes an exit surface 512 through which emergent light 514 passes through on its way to the LCD panel 430 (FIG. 4). Attached to the exit surface 512 is a diffraction grating 520 which is configured and arranged to redirect the emergent light 514 into a set of new directions, or diffracted orders, shown as taken by the incident light 516.

The diffraction grating 520 is a periodic structure (i.e., one that has a repeating pattern) that includes metallic and/or dielectric bumps and/or divots on the exit surface 520. In some implementations, the diffraction grating 520 may be replaced with a smooth surface in which the scattering provided by a refractive index contrast of two solid media. The transformation of the emergent light 514 by the diffraction grating 520 is given by Bragg's law:

$$\sin\theta_m = \sin\theta_0 + m\frac{\lambda}{p},$$

where $\theta_0$ is the angle of incidence on the grating, $\lambda$ is the wavelength of the incident light, p is the period, or pitch, or the grating (i.e., the distance over which the structures of the grating repeat), m is the order of the diffracted light, and $\theta_m$ is the angle at which that diffracted order propagates as the incident light 516. The amount of energy provided to each diffracted order ("diffraction efficiency") is dictated by the widths of the bumps/divots of the grating 520, as well as the refractive index contrast with the surrounding media, i.e. air in the "bump" case or the encapsulating media in other cases. The grating 520 may be configured to pass only one diffracted order to the LCD panel 430. Further, even though the angles of incidence of the diffracted orders vary strongly with wavelength, the structures of the diffraction grating 510 may be designed so as to direct the incident light 516 toward the LCD panel 436 at substantially the same angle.

FIG. 6 is a diagram of another example lightguide 610. The lightguide 610 includes an exit surface 612 through which emergent light 614 passes through on its way to the LCD panel 430 (FIG. 4). Attached to the exit surface 612 is an achromatic metasurface 620 which is constructed and arranged deflect the emergent light 614 in a prescribed direction 616 that is the same whether the emergent light 614 is red, green, or blue. The achromatic metasurface includes, in some arrangements, small antennas ("nanoantennas") made of a dielectric or metal material on a dielectric substrate. An advantage of the achromatic metasurface is that the diffraction efficiency of the deflected light 616 is the same for all wavelengths. This would enable the high-resolution and fast-switching desired in the HMD 400 (FIG. 4).

As shown in FIG. 6, the emergent light 514 enters a single lightguide 610 from a number of optical fibers, e.g., optical fibers 450 (FIG. 4). However, in some implementations, one optical fiber can produce light for an array of lightguides. It may be advantageous to have a plurality of lightguides in a single HMD to accommodate higher pixel densities. Such a situation is illustrated in FIG. 7.

Figure 7:
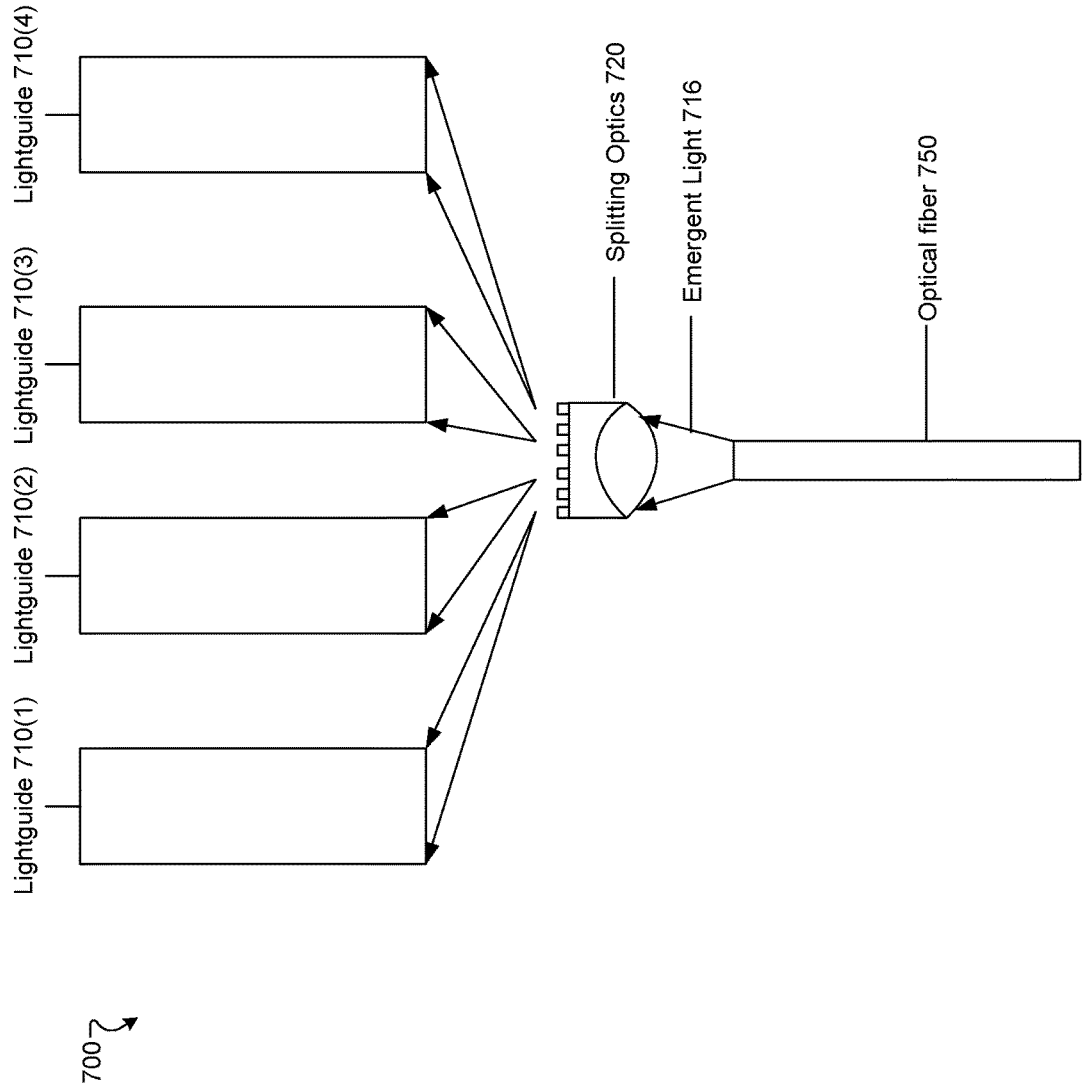
FIG. 7 is a diagram of example lightguides within the HMD shown in FIG. 4.

FIG. 7 is a diagram of example lightguides 710(1), 710(2), 710(3), and 710(4) within an HMD 700. As depicted in FIG. 7, a single optical fiber 750 provides light 716 for each of the lightguides 710(1), 710(2), 710(3), and 710(4). Between the optical fiber 750 and the lightguides 710(1), 710(2), 710(3), and 710(4) is a set of splitting optics 720 that is configured and arranged to split the emerging light 716 into the lightguides 710(1), 710(2), 710(3), and 710(4).

The splitting optics 720 is depicted in FIG. 7 as including a collimating lens system and a grating. However, in some arrangements the splitting optics may include a series of coated prisms or dichroic beamsplitters.

As shown in FIG. 7, the light split into each of the lightguides 710(1), 710(2), 710(3), and 710(4) enters at different angles. Thus, in order to direct the light from each of the lightguides 710(1), 710(2), 710(3), and 710(4), each of the lightguides should have gratings that direct the light into the same angles toward an LCD panel, e.g., LCD panel 430 (FIG. 4).

Figure 8:
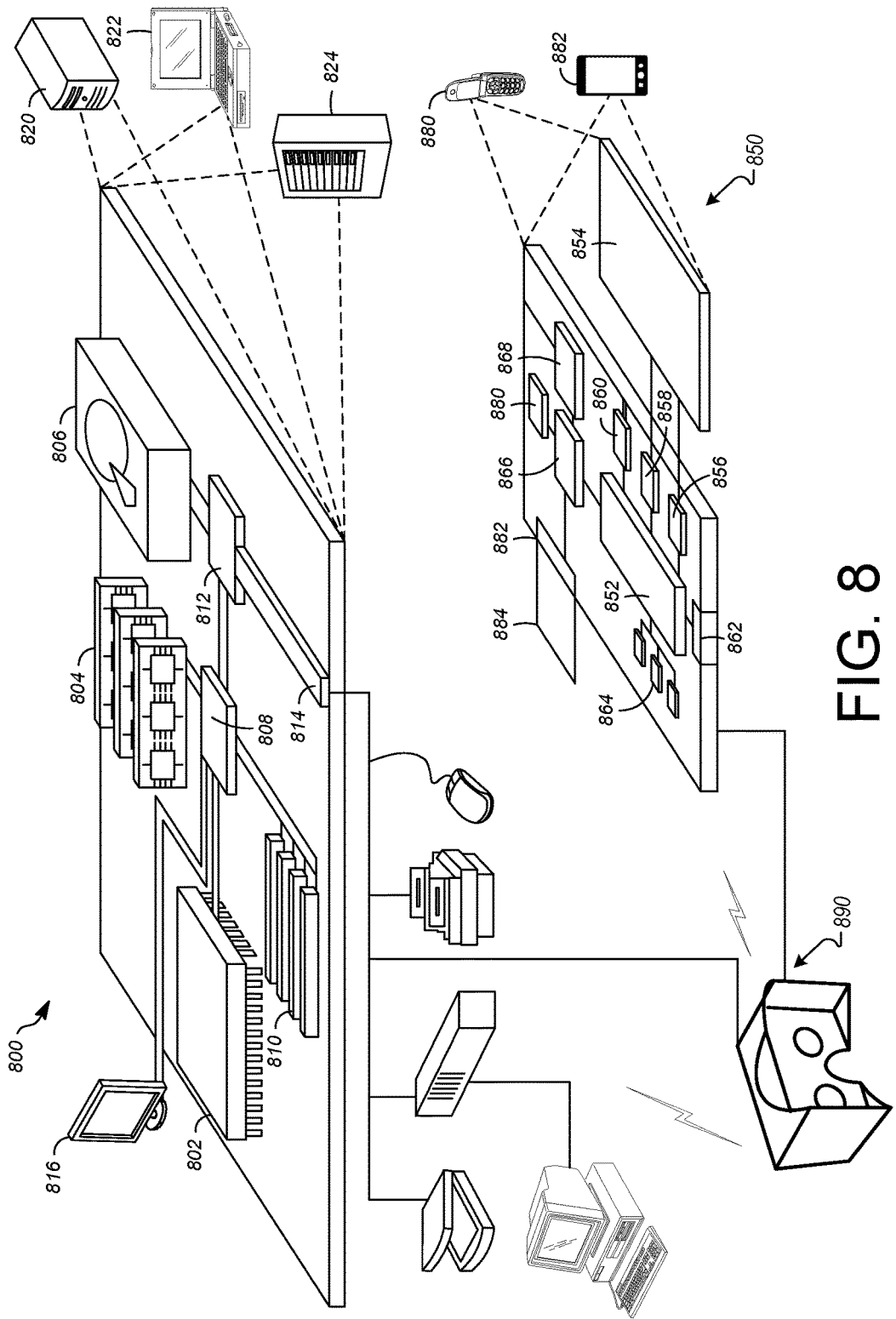
FIG. 8 is a diagram depicting an example of a computer device that can be used to implement the improvement described herein.

FIG. 8 shows an example of a generic computer device 800 and a generic mobile computer device 850, which may be used with the techniques described here in the context of applications involving VR. Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. In addition, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provided as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, Wi-Fi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 8 can include sensors that interface with a virtual reality (VR headset 890). For example, one or more sensors included on a computing device 850 or other computing device depicted in FIG. 8, can provide input to VR headset 890 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 850 can use the sensors to determine an absolute position and/or a detected rotation of the computing device in the VR space that can then be used as input to the VR space. For example, the computing device 850 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 850 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 850 when the computing device is incorporated into the VR space can cause a particular action to occur in the VR space.

In some implementations, a touchscreen of the computing device 850 can be rendered as a touchpad in VR space. A user can interact with the touchscreen of the computing device 850. The interactions are rendered, in VR headset 890 for example, as movements on the rendered touchpad in the VR space. The rendered movements can control objects in the VR space.

In some implementations, one or more output devices included on the computing device 850 can provide output and/or feedback to a user of the VR headset 890 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 850 may appear as another object in a computer-generated, 3D environment. Interactions by the user with the computing device 850 (e.g., rotating, shaking, touching a touchscreen, swiping a finger across a touch screen) can be interpreted as interactions with the object in the VR space. In the example of the laser pointer in a VR space, the computing device 850 appears as a virtual laser pointer in the computer-generated, 3D environment. As the user manipulates the computing device 850, the user in the VR space sees movement of the laser pointer. The user receives feedback from interactions with the computing device 850 in the VR space on the computing device 850 or on the VR headset 890.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smart phones, and other similar computing devices.

The components shown here, their connections and relationships, and their functions, are meant to be exemplary only, and are not meant to limit implementations of the inventions described and/or claimed in this document.

Figure 9:
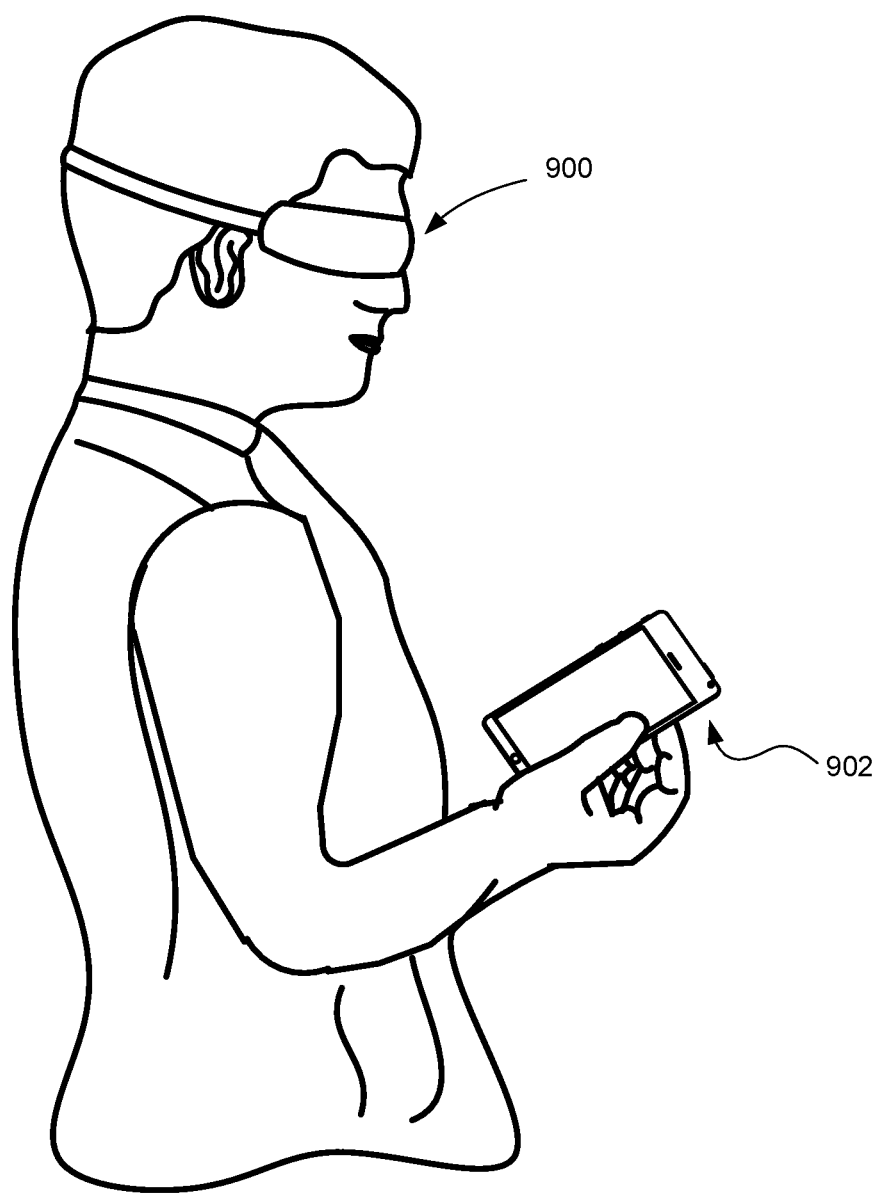
FIG. 9 is a diagram depicting an example HMD for use in a virtual reality (VR) environment.

FIG. 9 illustrates an example implementation of a head-mounted display as shown in FIGS. 3-7. In FIG. 9, a user wearing an HMD 900 is holding a portable handheld electronic device 902. The handheld electronic device 902 may be, for example, a smartphone, a controller, a joystick, or another portable handheld electronic device(s) that may be paired with, and communicate with, the HMD 900 for interaction in the immersive virtual environment generated by the HMD 900. The handheld electronic device 902 may be operably coupled with, or paired with the HMD 900 via, for example, a wired connection, or a wireless connection such as, for example, a WiFi or Bluetooth connection. This pairing, or operable coupling, of the handheld electronic device 902 and the HMD 900 may provide for communication between the handheld electronic device 902 and the HMD 900 and the exchange of data between the handheld electronic device 902 and the HMD 900. This may allow the handheld electronic device 902 to function as a controller in communication with the HMD 900 for interacting in the immersive virtual environment generated by the HMD 900. That is, a manipulation of the handheld electronic device 902, such as, for example, a beam or ray emitted by the handheld electronic device 902 and directed to a virtual object or feature for selection, and/or an input received on a touch surface of the handheld electronic device 902, and/or a movement of the handheld electronic device 902, may be translated into a corresponding selection, or movement, or other type of interaction, in the immersive virtual environment generated by the HMD 900. For example, the HMD 900, together with the handheld electronic device 902, may generate a virtual environment as described above, and the handheld electronic device 902 may be manipulated to effect a change in scale, or perspective, of the user relative to the virtual features in the virtual environment as described above.

FIGS. 10A and 10B are perspective views of an example HMD, such as, for example, the HMD 900 worn by the user in FIG. 9, and FIG. 10C illustrates an example handheld electronic device, such as, for example, the handheld electronic device 902 shown in FIG. 9.

The handheld electronic device 902 may include a housing 903 in which internal components of the device 902 are received, and a user interface 904 on an outside of the housing 903, accessible to the user. The user interface 904 may include a touch sensitive surface 906 configured to receive user touch inputs. The user interface 904 may also include other components for manipulation by the user such as, for example, actuation buttons, knobs, joysticks and the like. In some implementations, at least a portion of the user interface 904 may be configured as a touchscreen, with that portion of the user interface 904 being configured to display user interface items to the user, and also to receive touch inputs from the user on the touch sensitive surface 906. The handheld electronic device 902 may also include a light source 908 configured to selectively emit light, for example, a beam or ray, through a port in the housing 903, for example, in response to a user input received at the user interface 904.

The HMD 900 may include a housing 910 coupled to a frame 920, with an audio output device 930 including, for example, speakers mounted in headphones, also be coupled to the frame 920. In FIG. 2B, a front portion 910a of the housing 910 is rotated away from a base portion 910b of the housing 910 so that some of the components received in the housing 910 are visible. A display 940 may be mounted on an interior facing side of the front portion 910a of the housing 910. Lenses 950 may be mounted in the housing 910, between the user's eyes and the display 940 when the front portion 910a is in the closed position against the base portion 910b of the housing 910. In some implementations, the HMD 900 may include a sensing system 9160 including various sensors and a control system 970 including a processor 990 and various control system devices to facilitate operation of the HMD 900.

In some implementations, the HMD 900 may include a camera 980 to capture still and moving images. The images captured by the camera 980 may be used to help track a physical position of the user and/or the handheld electronic device 902 in the real world, or physical environment relative to the virtual environment, and/or may be displayed to the user on the display 940 in a pass through mode, allowing the user to temporarily leave the virtual environment and return to the physical environment without removing the HMD 900 or otherwise changing the configuration of the HMD 900 to move the housing 910 out of the line of sight of the user.

In some implementations, the HMD 900 may include a gaze tracking device 965 to detect and track an eye gaze of the user. The gaze tracking device 965 may include, for example, an image sensor 965A, or multiple image sensors 965A, to capture images of the user's eyes, for example, a particular portion of the user's eyes, such as, for example, the pupil, to detect, and track direction and movement of, the user's gaze. In some implementations, the HMD 900 may be configured so that the detected gaze is processed as a user input to be translated into a corresponding interaction in the immersive virtual experience.

A number of embodiments have been described. Nevertheless, it will be understood that various modifications may be made without departing from the spirit and scope of the specification.

Further implementations are summarized in the following examples:

EXAMPLE 1

A system, comprising: a head-mounted display (HMD); an external light source separate from the HMD, the external light source being configured and arranged to generate light; and at least one optical fiber disposed between the external light source and the HMD, the at least one optical fiber being configured to deliver light generated by the external light source to the HMD via a lightguide to provide illumination for the HMD.

EXAMPLE 2

The system as in example 1, wherein the HMD includes a display that includes a set of spatial light modulators (SLMs).

EXAMPLE 3

The system as in example 2, wherein an SLM of the set of SLMs includes a liquid crystal display (LCD).

EXAMPLE 4

The system as in example 3, wherein the LCD includes LCD pixels, each LCD pixel including a twisted nematic liquid crystal.

EXAMPLE 5

The system as in one of examples 2 to 4, wherein an SLM of the set of SLMs includes a microelectromechanical system (MEMS) grating light valve.

EXAMPLE 6

The system as in one of examples 1 to 5, wherein the at least one optical fiber configured to deliver the light is further configured and arranged to output the light to the lightguide in a specified polarization state.

EXAMPLE 7

The system as in one of examples 1 to 6, wherein the light source includes a set of diode lasers.

EXAMPLE 8

The system as in one of examples 1 to 7, wherein the external light source includes a source of red light configured to generate red light, a source of green light configured to generate green light, and a source of blue light configured to generate blue light.

EXAMPLE 9

The system as in example 8, wherein the external light source configured to generate the light is further configured to produce the red light, the green light, and the blue light in a sequential order.

EXAMPLE 10

The system as in example 8 or 9, wherein each of the source of red light, the source of green light, and the source of blue light has a respective center wavelength larger than a specified reference wavelength.

EXAMPLE 11

The system as in one of examples 8 to 10, wherein the light guide includes an achromatic metasurface configured to direct the red light, the green light, and the blue light to substantially the same location within the HMD.

EXAMPLE 12

The system as in one of examples 1 to 11, wherein the lightguide directs the light delivered by the at least one optical fiber using a diffraction grating.

EXAMPLE 13

The system as in example 12, wherein the diffraction grating is configured to scatter substantially all of the light coupled into the lightguide into a specified set of propagation angles.

EXAMPLE 14

The system as in one of examples 1 to 13, further comprising, for each of the at least one optical fiber, a respective optical system configured to send the light delivered by that optical fiber into a respective plurality of lightguides.

EXAMPLE 15

The system as in one of examples 1 to 14, wherein the external light source is included in a base unit, the base unit being configured to generate images for display on the HMD.

EXAMPLE 16

A method, comprising: generating light by an external light source; and transmitting the generated light to a head-mounted display (HMD) separate from the external light source via at least one fiber optic, the at least one optical fiber being configured to deliver the light generated by the external light source to the HMD via a lightguide to provide illumination for the HMD.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A system, comprising:
    a head-mounted display, HMD;
    an external light source separate from the HMD, the external light source including a red light source configured to generate red light, a green light source configured to generate green light, and a blue light source configured to generate blue light, the green light source being disposed between the red light source and the blue light source so that the external light source is configured to produce the red light, the green light, and the blue light in a sequential order; and
    at least one optical fiber disposed between the external light source and the HMD, the at least one optical fiber being configured to deliver light generated by the external light source to the HMD via a lightguide to provide illumination for the HMD and including a first optical fiber configured to deliver red light from the red light source to the HMD, a second optical fiber configured to deliver green light from the green light source to the HMD, and a third optical fiber configured to deliver blue light from the blue light source to the HMD.

2. The system as in claim 1, wherein the HMD includes a display that includes a set of spatial light modulators, SLMs.

3. The system as in claim 2, wherein an SLM of the set of SLMs includes a liquid crystal display, LCD.

4. The system as in claim 3, wherein the LCD includes LCD pixels, each LCD pixel including a twisted nematic liquid crystal.

5. The system as in claim 2, wherein an SLM of the set of SLMs includes a microelectromechanical system, MEMS, grating light valve.

6. The system as in claim 1, wherein the at least one optical fiber configured to deliver the light is further configured and arranged to output the light to the lightguide in a specified polarization state.

7. The system as in claim 1, wherein the light source includes a set of diode lasers.

8. The system as in claim 1, wherein the light guide includes an achromatic metasurface configured to direct the red light, the green light, and the blue light to substantially the same location within the HMD.

9. The system as in claim 1, wherein the lightguide directs the light delivered by the at least one optical fiber using a diffraction grating.

10. The system as in claim 9, wherein the diffraction grating is configured to scatter substantially all of the light coupled into the lightguide into a specified set of propagation angles.

11. The system as in claim 1, further comprising, for each of the at least one optical fiber, a respective optical system configured to send the light delivered by that optical fiber into a respective plurality of lightguides.

12. The system as in claim 1, wherein the external light source is included in a base unit, the base unit being configured to generate images for display on the HMD.

13. A method, comprising:
generating red light, green light, and blue light by an external light source; and
transmitting the generated light to a head-mounted display, HMD, separate from the external light source via at least one fiber optic, the at least one optical fiber being configured to deliver the light generated by the external light source to the HMD via a lightguide to provide illumination for the HMD and including a first optical fiber configured to deliver red light from the external light source to the HMD, a second optical fiber configured to deliver green light from the external light source to the HMD, and a third optical fiber configured to deliver blue light from the external light source to the HMD, the lightguide includes a grating structure on an exit surface of the lightguide, the grating structure configured to direct the light having a first wavelength with a first propagation angle and a second wavelength with a second propagation angle.

14. The method as in claim 13, wherein transmitting the generated light to the HMD includes outputting the light to the lightguide in a specified polarization state.

15. The method as in claim 13, wherein the first wavelength with the first propagation angle light is directed toward a display of the HMD and the second wavelength with the second propagation angle light is directed away from the display of the HMD.

16. The method of claim 13, wherein the first wavelength with the first propagation angle light is red light and the second wavelength with the second propagation angle light is blue light.

17. A system, comprising:
a head-mounted display, HMD;
an external light source separate from the HMD, the external light source including a red light source configured to generate red light, a green light source configured to generate green light, and a blue light source configured to generate blue light;
at least one optical fiber disposed between the external light source and the HMD, the at least one optical fiber being configured to deliver light generated by the external light source to the HMD, the at least one optical fiber including a first optical fiber configured to deliver red light from the red light source to the HMD, a second optical fiber configured to deliver green light from the green light source to the HMD, and a third optical fiber configured to deliver blue light from the blue light source to the HMD; and
a lightguide configured to provide illumination for the HMD, the lightguide including a grating structure configured to deliver the light having a first wavelength with a first propagation angle toward a display of the HMD and a second wavelength with a second propagation angle away from the display of the HMD.

18. The method of claim 17, wherein the first wavelength with the first propagation angle light is delivered by the first optical fiber and the second wavelength with the second propagation angle light is delivered by the third optical fiber.

* * * * *